(12) United States Patent
Pederson et al.

(10) Patent No.: US 9,330,159 B2
(45) Date of Patent: May 3, 2016

(54) TECHNIQUES FOR FINDING A COLUMN WITH COLUMN PARTITIONING

(71) Applicant: TERADATA US, INC., Dayton, OH (US)

(72) Inventors: Donald R. Pederson, San Diego, CA (US); Paul Sinclair, Manhattan Beach, CA (US)

(73) Assignee: Teradata US, Inc., Dayton, OH (US)

( * ) Notice: Subject to any disclaimer, the term of this patent is extended or adjusted under 35 U.S.C. 154(b) by 345 days.

(21) Appl. No.: 13/728,361

(22) Filed: Dec. 27, 2012

(65) Prior Publication Data

US 2014/0188820 A1 Jul. 3, 2014

(51) Int. Cl.
*G06F 17/30* (2006.01)
(52) U.S. Cl.
CPC .... *G06F 17/30584* (2013.01); *G06F 17/30483* (2013.01)
(58) Field of Classification Search
CPC ....................................................... G06F 17/30
USPC .......................................................... 707/693
See application file for complete search history.

(56) References Cited

U.S. PATENT DOCUMENTS

| 6,405,198 | B1 * | 6/2002 | Bitar et al. ............................ 1/1 |
| 6,674,911 | B1 | 1/2004 | Pearlman et al. |
| 6,909,384 | B2 | 6/2005 | Baldwin et al. |
| 6,937,171 | B2 | 8/2005 | Baldwin et al. |
| 7,026,964 | B2 | 4/2006 | Baldwin et al. |
| 7,148,823 | B2 | 12/2006 | Baldwin et al. |
| 7,151,471 | B2 | 12/2006 | Baldwin et al. |
| 7,433,893 | B2 | 10/2008 | Lowry |
| 8,037,035 | B2 | 10/2011 | Kataoka et al. |
| 8,819,367 | B1 * | 8/2014 | Fallone et al. ................ 711/162 |
| 2008/0082489 | A1 * | 4/2008 | Chen et al. ........................ 707/3 |
| 2008/0082552 | A1 * | 4/2008 | Krishnaswamy ............. 707/100 |
| 2008/0222136 | A1 * | 9/2008 | Yates et al. ........................ 707/5 |
| 2012/0084278 | A1 * | 4/2012 | Franke et al. ................. 707/719 |
| 2012/0117509 | A1 * | 5/2012 | Powell et al. ................. 715/786 |

* cited by examiner

*Primary Examiner* — Etienne Leroux
*Assistant Examiner* — Farhad Agharahimi
(74) *Attorney, Agent, or Firm* — Schwegman, Lundberg & Woessner, P.A.

(57) ABSTRACT

Techniques for finding a column with column partitioning are provided. Metadata for a container row is expanded to include information for searching ranges of partitioned column values. The metadata identifies offsets to specific ranges and specific columns within a specific range. The offsets also identify where compressed data for a desired column resides. Thereby, permitting partitioned columns having compressed data to be located without being decompressed and decompressed on demand as needed.

19 Claims, 3 Drawing Sheets

TECHNIQUES FOR FINDING A COLUMN WITH COLUMN PARTITIONING

BACKGROUND

In large commercial database systems it is often beneficial to partition the table of a database into smaller tables or segments, such that each smaller table or segment is capable of being individually accessed within a processing node. This promotes reduced input and output when only a subset of the partitions is referenced and improves overall database performance.

A popular approach to segmenting databases is referred to as row (or horizontal) partitioning. Here, rows of a database are assigned to a processing node (by hashing or randomly) and partitioned into segments within that processing node of the database system.

Another approach is to group columns together into segments (referred to as column or vertical partitioning), where each group of columns for rows assigned to a processing node are partitioned into segments within that processing node of the database system.

Both row and column partitioning have advantages to improving overall database performance.

In addition, a recent approach combines both horizontal and vertical portioning together. In particular, the approach finds a value within a container row associated with a specific row identifier (SRowId). The row identifier can be used to read the container row that has a beginning row identifier (BRowId), that is the highest row identifier less than or equal to SRowId. To find the value associated with SRowId, SRowId−BRowId+1 is calculated, call this n, and the nth value in the container row then needs to be found. Presence bits, VLC bits, run length bits (that is, the autocompression bits) may occur in the container row and must be checked in sequence to find this $n^{th}$ value since values may be omitted or multiple occurrences of a value compressed to one occurrence of the value (in the case of run length bits that indicate a run length greater than one). While checking, a pointer to the current column partition value must be incremented when the value is present. A container row can represent 1000's of values. Sequencing though all these bits (there is one set for each value represented) to determine the corresponding value could take a long time particularly for large commercial databases.

SUMMARY

In various embodiments, techniques for finding a column with column (vertical) partitioning are presented. According to an embodiment, a method for finding a column with column partitioning is provided.

Specifically, metadata is accessed for a container row associated with column partitions of a database for purposes of searching for a column value corresponding to a specific row identifier. Next, a compression flag is identified that is set in the metadata and that indicates that a number of columns within the column partitions are compressed. Finally, a compressed column cell matching the row identifier is found by searching ranges and accessing offsets defined in the metadata for the compressed columns.

DETAILED DESCRIPTION

Figure 1:
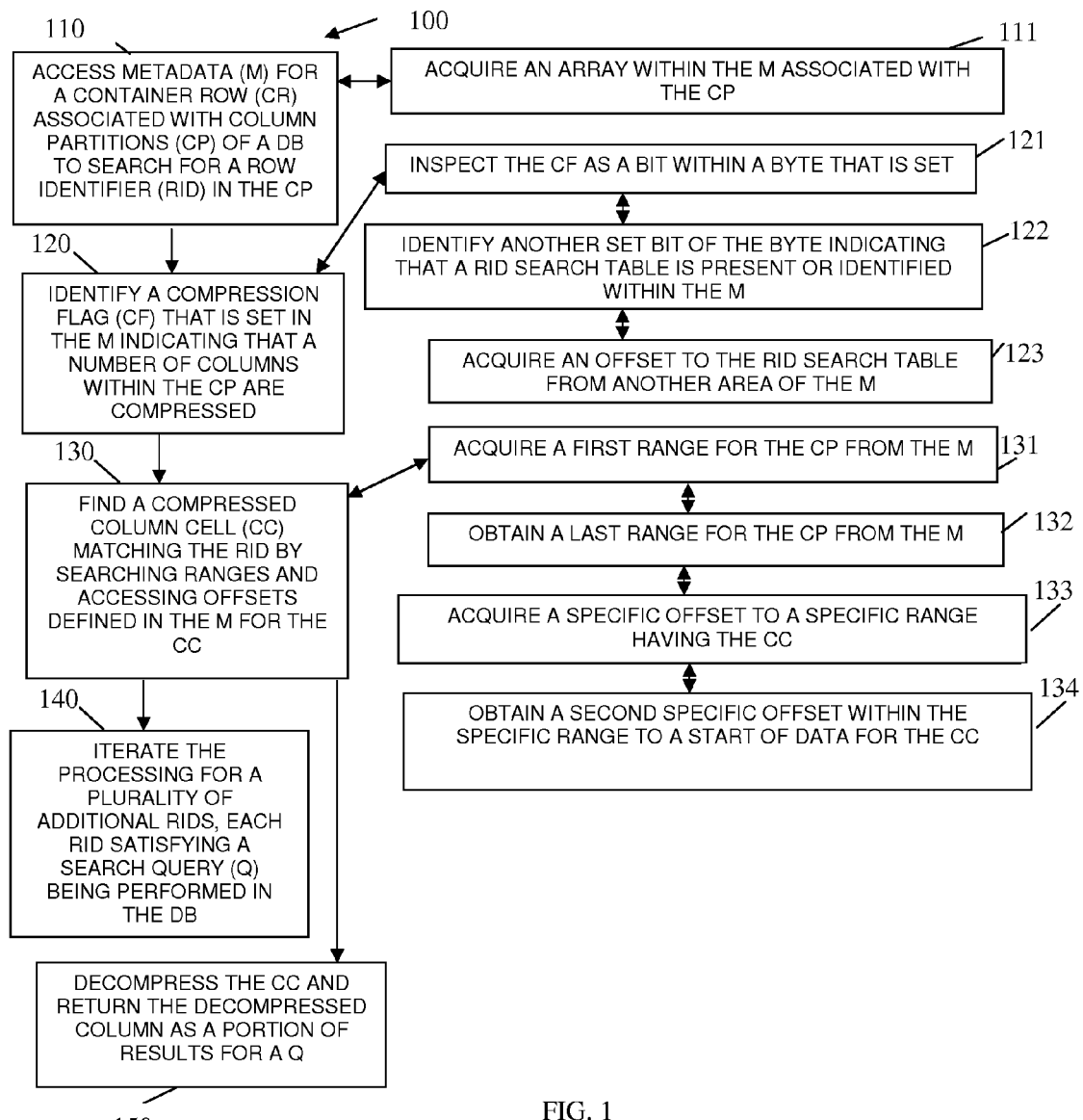
FIG. 1 is a diagram of a method for finding a column with column partitioning, according to an example embodiment.

FIG. 1 is a diagram of a method 100 for finding a column with column partitioning, according to an example embodiment. The method 100 (hereinafter "column locator") is implemented as executable instructions within a non-transitory computer-readable storage medium that execute on a plurality of processors, the processors specifically configured to execute the column locator. Moreover, the column locator is programmed within a non-transitory computer-readable storage medium. The column locator may also be operational over a network; the network is wired, wireless, or a combination of wired and wireless.

Before discussing the processing associated with the column locator some example details regarding embodiments of the invention and context are presented.

In various embodiments herein, some additional metadata is included with container rows to facilitate efficient and novel finding of column values for column partitioning database systems. The metadata is included in container rows as an array that can be searched to find a range having a desired row identifier (rowid) and a corresponding offset value within that range along with another offset to autocompression bits for the first value in the range. Then, the value for the desired rowid can be found searching through the autocompression bits (and incremented by the offset to the value based on the autocompression bits) to find the value.

The following table is an example layout for a container row with fixed-length column partition values. The novel metadata fields being added are identified in bold text (it is to be noted that the same highlighted fields below are also included in a container row with variable-length column partition values—that is fixed-length column partitioning is not required as variable length column partitioning can be used as well). Moreover, the technique for initially modifying and managing the novel metadata is provided below with the discussion of the FIG. 2.

| Field | Length | Comments |
| --- | --- | --- |
| RowLength | 2 bytes | Same for all physical rows. |
| H0 | 2 bytes | Same for all physical rows. |
| H1 | 2 bytes | Same for all physical rows. |
| U0 | 2 bytes | Same for all physical rows. |
| U1 | 2 bytes | Same for all physical rows. |
| Flags | 1 byte | Same for all physical rows. 2 bits are used to indicate whether 2-byte or 8-byte partitioning as currently. A container cannot be non partitioned. |

-continued

| | Field | Length | Comments |
|---|---|---|---|
| 1 | ACTBD AC LVLC R RIDS 0 0 | 1 byte | 1st presence byte, which is in all physical rows is used for autocompression flags in a container: ACTBD—autocompression to be determined. If set, the LVLC and R bits are zero. AC—autocompressed or not. LVLC—local VLC dictionary or not. R—run-length compression or not. RIDS—rowid search table included or not. Note that the RIDS bit can only be set if the AC bit is set. Note that, if this is a single-column column partition, the column is nullable or has user-specified compression, and ACTBD is 1, the AC bit is 1. |
| | Part | 2 bytes for 2-byte partitioning 8 bytes for 8-byte partitioning (see flag bits for the type of partitioning) | Internal partition number and is the same for all physical rows. The following layout is unique to containers. |
| | CPValuesCount | 4 bytes | Count of the number of CPValues represented by this container. This can be greater than the number of CPValues present and the number of ACBits due to compression. Note this count includes logically deleted rows. |
| | OffsetToFreeSpace | 2 bytes | Offset to the first byte of free space. |
| | OffsetToLastACBits | 2 bytes | Offset to the last byte of ACBits. Only included if the AC bit is set in the 1st presence byte. |
| | ACTCount | 1 byte | Count of the ACTs (autocompression types) applied to this container. Omitted if the AC bit is not set in the 1st presence byte. |
| | $ACT_1$ | 1 byte | 1st autocompression type (ACT). Omitted (along with its arguments) if the AC bit is not set in the 1st presence byte. |
| | $Arg_{11}$ | 1 or more bytes depending on $ACT_1$ | 1st argument for this ACT. Omitted if his ACT has no arguments. |
| | ... | ... | More arguments for this ACT |
| | $Arg_{1a}$ | 1 or more bytes depending on $ACT_1$ | Last argument for this ACT. The number of arguments 1a is as defined by this ACT. |
| | ... | ... | More ACTs and their arguments. Omitted if the AC bit is not set in the 1st presence byte. |
| | $ACT_t$ | 1 byte | Last autocompression type (ACT). Omitted (along with its arguments) if the AC bit is not set in the 1st presence byte. |

-continued

| Field | Length | Comments |
|---|---|---|
| $Arg_{t1}$ | 1 or more bytes depending on $ACT_t$ | 1st argument for this ACT. Omitted if this ACT has no arguments. |
| ... | ... | More arguments for this ACT. |
| $Arg_{ta}$ | 1 or more bytes depending on $ACT_t$ | Last argument for this ACT. The number of arguments ta is as defined by this ACT. |
| $LVLC_1$ | n bytes where n is the fixed-length in bytes of CPValues for this column partition | 1st CPValue for the local VLC dictionary if the LVLC bit is set in the 1st presence byte. |
| ... | ... | More CPValues for the local VLC dictionary. |
| $LVLC_o$ | n bytes where n is the fixed-length in bytes of CPValues for this column partition | Last CPValue for the local VLC dictionary if the LVLC bit is set in the 1st presence byte. o is an arg to an ACT specifying LVLC. |
| OffsetToRidSearch | 2 bytes | Offset to the RID search table (OffestToRidSearch - 1 is the offset to the first byte of the ACBits) if the RIDS bit is set in the 1st presence byte. Omitted if the RIDS bit is not set in the 1st presence byte (row length - 1 is the offset to the last byte of the ACBIts). Note that the RIDS bit can only be set if the AC bit is set in the 1st presence byte. |
| $CPValue_1$ | $m_1$ bytes where $m_1$ is the number of bytes present for this CPValue | 1st present CPValue. $m_1$ may be less than the fixed-length n bytes of CPValues for this column partition if the ACBits indicate the number of bytes stored (after trimming) or the number of bytes trimmed. |
| ... | ... | More present CPValues. |
| $CPValue_v$ | $m_v$ bytes where $m_v$ is the number of bytes present for this CPValue | Last present CPValue. $m_v$ may be less than the fixed-length n bytes of CPValues for this column partition if the ACBits indicate the number of bytes stored (after trimming) or the number of bytes trimmed. |
| ... FreeSpace ... | 1. (OffsetToLastACBits - OffsetToFreeSpace) bytes 2. (RowLength - OffsetToFreeSpace) bytes | Use 1 if the AC or ACTBD bit is set and it's a nullable single-column partition. Else use 2. |
| ... FreeACBits ... | (i * k) modulo 8 bits | Unused (set to zero). Omitted if the AC bit is not set in the 1st presence byte. |
| $ACBits_j$ | k bits where k is the number of bits needed for compressing a CPValue per the ACTs and their arguments | Last set of ACBits. Omitted if the AC bit is not set in the 1st presence byte. |
| ... | ... | More sets of ACBits. Omitted if the AC bit is not set in the 1st presence byte. |
| $ACBits_1$ | k bits where k is the number of bits needed for compressing a CPValue per the ACTs and their arguments | 1st set of ACBits. Omitted if the AC bit is not set in the 1st presence byte. |

-continued

| Field | Length | Comments |
|---|---|---|
| $CPValuesCount_1$ | 29 bits | CPValues count in the first range of the ACBIts and CPValues. Omitted if the RIDS bit is not set in the $1^{st}$ presence byte. CPValue count must be such that, if the corresponding ACBits indicate a run length, that it includes the CPValues for the run length. |
| $BitOffsetToACBits_1$ | 3 bits | Bit offset in the ACBIts byte for the first CPValue in the first range. Omitted if the RIDS bit is not set in the $1^{st}$ presence byte. |
| $OffsetToACBits_1$ | 2 bytes | Byte offset to the ACBits for the first CPValue in the first range. Omitted if the RIDS bit is not set in the $1^{st}$ presence byte. |
| $OffsetToCPValues_1$ | 2 bytes | Byte offset to the first CPValue in the first range. Omitted if the RIDS bit is not set in the $1^{st}$ presence byte. |
| ... | ... | More ranges. Omitted if the RIDS bit is not set in the $1^{st}$ presence byte. |
| $CPValuesCount_r$ | 29 bits | CPValues count in the last range of the ACBIts and CPValues. Omitted if the RIDS bit is not set in the $1^{st}$ presence byte. CPValue count must be such that, if the corresponding ACBits indicate a run length, that it includes the CPValues for the run length. |
| $BitOffsetToACBits_r$ | 3 bits | Bit offset in the ACBIts byte for the first CPValue in the last range. Omitted if the RIDS bit is not set in the $1^{st}$ presence byte. |
| $OffsetToACBits_r$ | 2 bytes | Byte offset to the ACBits for the first CPValue in the last range. Omitted if the RIDS bit is not set in the $1^{st}$ presence byte. |
| $OffsetToCPValues_r$ | 2 bytes | Byte offset to the first CPValue in the last range. Omitted if the RIDS bit is not set in the $1^{st}$ presence byte. |

The sample metadata carried with container rows of a database having column partitioning can be used to find a desired column (column value) for a search as follows. To find the nth value:

```
i = 1;
again:
If n <= CPValuesCount[i],
    Search for nth value as before but start from BitOffsetToACBits[i],
        OffsetToACBit[i], and OffsetToCPValues[i] and exit;
n = n - CPValuesCount[i];
i = i + 1;
Go to again;
```

This can be further optimized by doing a binary search of the array (metadata discussed above in the example). In this case, a CPValuesCount is included in the count for all the preceding values.

As will be described herein, the above provides a variety of benefits, such as but not limited to allowing a container row to be larger without incurring a large increase in search cost to locate a find value (column) in the container. Moreover, larger container rows allow for improved compression by not repeating a local dictionary as often. Also, the overhead to switch from one container row to the next occurs less often, which benefits scans of the data.

For example, assuming a container row with the maximum size of 65 KB with 4-byte column partition values, half the values are compressed, and there are 8 bits for autocompression per value (the 8 bits are being used for multivalue compression), the container row can represent about 26,000 values. Say a range in the array covers 100 values so there are 260 array entries (26,000/100). The search through the array on average will have 130 checks. And, the average number of autocompression bits to check is 50. So there are 180 checks on average instead of the 13,000 checks on average without the array. In the worst case for this example, there are 360 checks compared to 26,000 checks.

It is with this initial context that the processing associated with the column locator is now discussed with reference to the FIG. 1.

At 110, the column locator accesses metadata for a container row. The container row identifies and uses column partitions of a database that is vertically partitioned. The column locator makes access for purposes of assisting in processing a search for a given row identifier within the column partitions. An example, container row defined by specific metadata that is accessed was presented above in the sample table.

According to an embodiment, at 111, the column locator acquires an array within the metadata associated with the column. The array can be used to enhance or extend the metadata and providing details for searching compressed columns associated with the column partitions.

At 120, the column locator identifies a compression flag that is set in the metadata indicating that a number of the columns within the column partitions are compressed. So, the partitioned columns do not have to be decompressed to be searched rather, usage of the metadata provides a mechanism for matching a search to a given compressed column cell before that compressed column cell has to be decompressed and returned as a portion of search results being processed by the database.

In an embodiment, at 121, the column locator inspects the compression flag as a bit within a byte that is set. An example, of this was provided above with the sample table for the metadata.

Continuing with the embodiment of 121 and at 122, the column locator identifies another set bit of the byte indicating that a row identifier search table is present or identified within the metadata. Again, this was shown in the sample metadata table for the sample container row above.

Still continuing with the embodiment of 122 and at 123, the column locator acquires an offset to the row identifier search table from another area of the metadata. So, data set within the metadata indicates that other data exists within that metadata.

At 130, the column locator finds a compressed column cell matching the row identifier by searching ranges and accessing offsets defined in the metadata for the compressed column cell. That is, every data references within the metadata as defined above with the sample metadata table provide a mechanism for finding a specific compressed column cell within the partitioned columns of the database that satisfies a search request or a portion of a search request.

In an embodiment, at 131, the column locator acquires a first range for the column partitions from the metadata. Similarly, at 132, the column locator obtains a last range for the column partitions from the metadata.

Continuing with the embodiments of 131-132 and at 133, the column locator acquires a specific offset to a specific range having the compressed column cell. At 134, the column locator obtains a second specific offset within the specific range to a start of data for the compressed column cell.

According to an embodiment, at 140, the column locator iterates the processing of 110-134 for a plurality of additional row identifiers. Each row identifier satisfying a search query being performed in the database.

In another case, at 150, the column locator decompresses the compressed column cell and returns the decompressed column cell as a portion of results for a search query.

Figure 2:
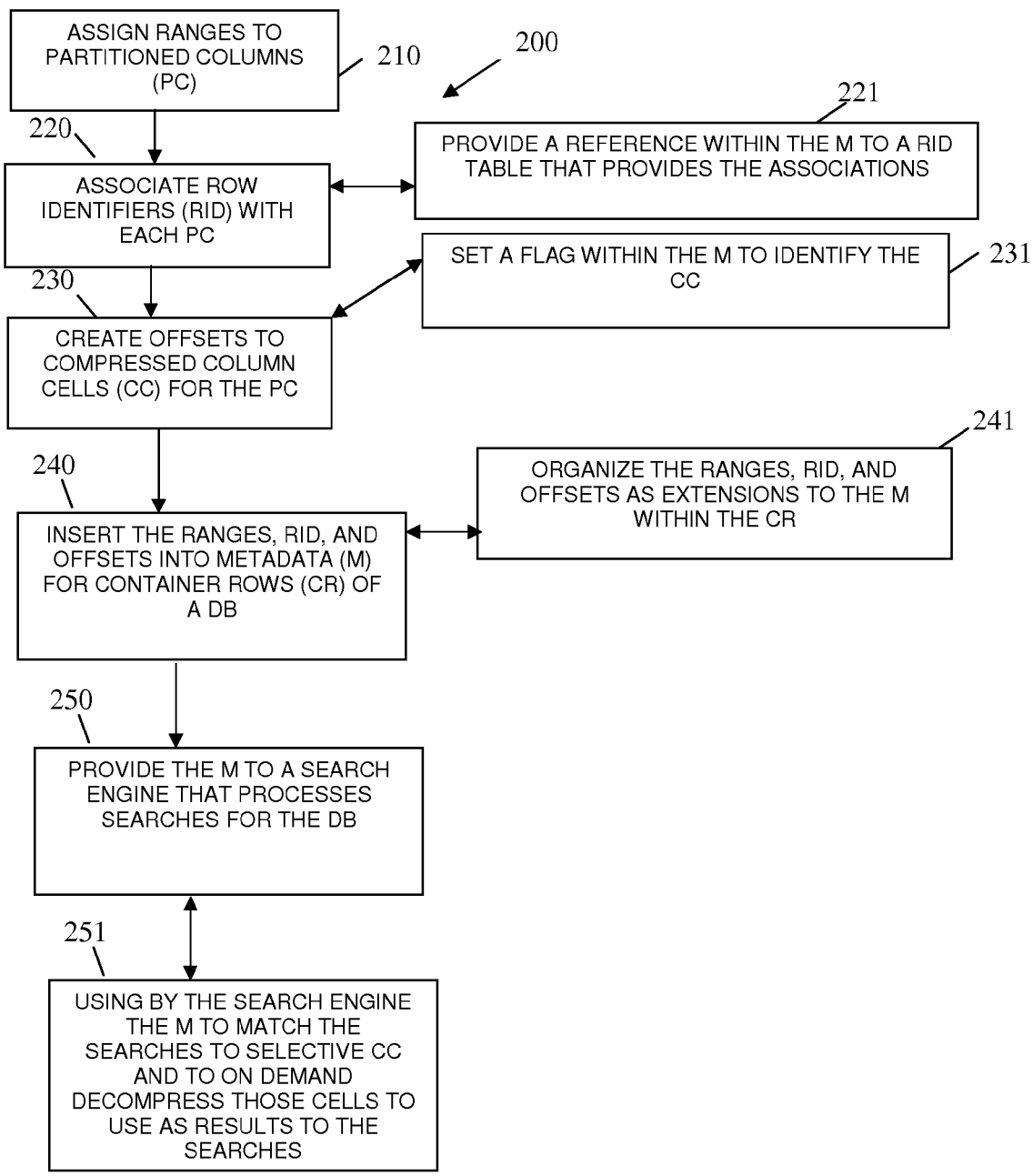
FIG. 2 is a diagram of a method for modifying metadata to assist in finding a column with column partitioning, according to an example embodiment.

FIG. 2 is a diagram of a method 200 for modifying metadata to assist in finding a column with column partitioning, according to an example embodiment. The method 200 (hereinafter "metadata builder") is implemented as instructions within a non-transitory computer-readable storage medium that execute on a plurality of processors, the processors specifically configured to execute the metadata builder. Moreover, the metadata builder is programmed within a non-transitory computer-readable storage medium. The metadata builder may also be operational over a network; the network is wired, wireless, or a combination of wired and wireless.

The metadata builder builds and manages the array and bolded elements of the sample table presented above with the initial discussion of the FIG. 1. The column locator of the FIG. 1 uses the container metadata (array information) created by the metadata builder.

At 210, the metadata builder assigns ranges to partitioned columns. That is, ranges for partitioned column values are assigned and maintained.

At 220, the metadata builder associates row identifiers with each partitioned column.

According to an embodiment, at 221, the metadata builder provides a reference within the metadata to a row identifier table that provides the associations.

At 230, the metadata builder creates offsets to compressed column cells for the partitioned columns.

In an embodiment, at 231, the metadata builder sets a flag within the metadata to identify the compressed column cells.

At 240, the metadata builder inserts the ranges, row identifiers, and offsets into metadata for container rows of a database.

According to an embodiment, at 241, the metadata builder organizes the ranges, row identifiers, and offsets as extensions to the metadata within the container rows.

In an embodiment, at 250, the metadata builder provides the metadata to a search engine that processes the searches for a database.

Continuing with the embodiment of 250 and at 251, the metadata builder uses, by the search engine, the metadata to match the searches to selective compressed column cells and to on demand decompress those cells to use as results to the searches.

Figure 3:
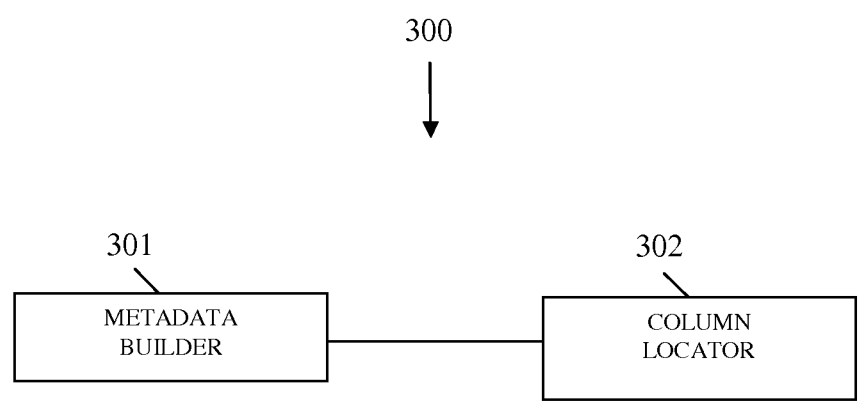
FIG. 3 is a diagram of a column location system, according to an example embodiment.

FIG. 3 is a diagram of a column location system 300, according to an example embodiment. The column location system 300 is implemented, resides, and is programmed within a non-transitory computer-readable storage medium and executes on one or more processors specifically configured to execute the components of the column location system 300. Moreover, the column location system 300 may be operational over a network and the network is wired, wireless, or a combination of wired and wireless.

The column location system 300 implements, inter alia, the techniques presented and described above with reference to the FIGS. 1-2.

The column location system 300 includes a metadata builder 301 and a column locator 302. Each of these and their interactions with one another will now be discussed in turn.

The metadata builder 301 is programmed and implemented within memory and/or within a non-transitory computer-readable storage medium for execution on one or more processors of the network. The one or more processors are specifically configured to process the metadata builder 301.

Details of the metadata builder 301 were presented above with respect to the method 200 of the FIG. 2.

The metadata builder 301 is configured to organize information for partitioned columns of a database having compressed column cells within metadata for container rows. The details of which are achieved and a sample implementation within metadata of a container row was discussed above with reference to the FIG. 1 and with reference to the FIG. 2.

The column locator 302 is programmed and implemented within memory and/or a non-transitory computer-readable storage medium for execution on one or more processors of the network. The one or more processors are specifically configured to process the column locator 302. Details of the column locator 302 were presented above with respect to the method 100 the FIG. 1.

The column locator 302 is configured to process the metadata to process searches for finding specific compressed column cells and decompressing those cells on demand. Again, this was discussed in detail above with reference to the FIGS. 1 and 2.

According to an embodiment, the column locator 302 is integrated into search engine processing for the database.

In another case, the container rows are represented as the metadata.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by a processor, the processor configured to execute the method, comprising:
   accessing, via the processor, metadata for a container row associated with column partitions of a database to search for a row identifier present in the column partitions, wherein accessing further includes performing a binary search on the metadata, wherein the metadata is included as a bit array in the container row that is searchable past a given offset value within the bit array;
   identifying, via the processor, a compression flag that is set in the metadata indicating that a number of columns within the column partitions are compressed; and
   finding, via the processor, a compressed column cell matching the row identifier by searching ranges and accessing offsets defined in the metadata for the compressed columns.

2. The method of claim 1 further comprising, iterating, via the processor, the method for a plurality of additional row identifiers, each row identifier satisfying a search query being performed in the database.

3. The method of claim 1 further comprising, decompressing, via the processor, the compressed column and returning the decompressed column as a portion of results for a search query.

4. The method of claim 1, wherein identifying further includes inspecting the compression flag as a bit within a byte that is set.

5. The method of claim 4, wherein inspecting further includes identifying another set bit of the byte indicating that a row identifier search table is present or identified within the metadata.

6. The method of claim 5, wherein identifying further includes acquiring an offset to the row identifier search table from another area of the metadata.

7. The method of claim 1, wherein finding further includes acquiring a first range for the column partitions from the metadata.

8. The method of claim 7, wherein acquiring further includes obtaining a last range for the column partitions from the metadata.

9. The method of claim 8, wherein obtaining further includes acquiring a specific offset to a specific range having the compressed column cell.

10. The method of claim 9, wherein acquiring further includes obtaining a second specific offset within the specific range to a start of data for the compressed column cell.

11. A method implemented and programmed within a non-transitory computer-readable storage medium and processed by a processor, the processor configured to execute the method, comprising:
    assigning, via the processor, ranges to partitioned columns;
    associating, via the processor, row identifiers with each partitioned column;
    creating, via the processor, offsets to compressed column cells for the partitioned columns; and
    inserting, via the processor, the ranges, row identifiers, and offsets into metadata for container rows of a database for permitting the metadata to be binary searched for the ranges, the row identifiers, and the offsets wherein the metadata is included as bit arrays within container rows that is searchable past given offset values within the bit arrays.

12. The method of claim 11 further comprising, providing, via the processor, the metadata to a search engine that processes searches for the database.

13. The method of claim 12, wherein providing further includes using, by the search engine the metadata to match the searches to selective compressed column cells and to on demand decompress those cells to use as results to the searches.

14. The method of claim 11, wherein associating further includes providing a reference within the metadata to a row identifier table that provides the associations.

15. The method of claim 11, wherein creating further includes setting a flag within the metadata to identify the compressed column cells.

16. The method of claim 11, wherein inserting further includes organizing the ranges, row identifiers, and the offsets as extensions to the metadata within the container rows.

17. A processor-implemented system, comprising:
    a memory programmed with a metadata builder for execution on a processor; and
    the memory also programmed with a column locator for execution on the processor;
    the metadata builder is configured to organize information for partitioned columns of a database having compressed column cells within metadata for container rows, and the metadata builder is configured to organize the information within the metadata for permitting the metadata to be binary searched, and the column locator is configured to process the metadata to process searches for finding specific compressed column cells and decompressing those cells on demand and wherein the metadata is included as bit arrays in the container rows that is searchable past given offset values within the bit arrays.

18. The system of claim 17, wherein the column locator is integrated into search engine processing for the database.

19. The system of claim 17, wherein the container rows are represented as the metadata.

* * * * *